United States Patent
Huang et al.

(10) Patent No.: US 12,402,772 B2
(45) Date of Patent: Sep. 2, 2025

(54) AUTOMATIC DETERGENT FEEDING DEVICE AND WASHING APPARATUS

(71) Applicants: CHONGQING HAIER DRUM WASHING MACHINE CO., LTD., Chongqing (CN); HAIER SMART HOME CO., LTD., Shandong (CN)

(72) Inventors: Tao Huang, Shandong (CN); Liping Li, Shandong (CN); Huacheng Zhang, Shandong (CN)

(73) Assignees: CHONGQING HAIER DRUM WASHING MACHINE CO., LTD., Chongqing (CN); HAIER SMART HOME CO., LTD., Shandong (CN)

( * ) Notice: Subject to any disclaimer, the term of this patent is extended or adjusted under 35 U.S.C. 154(b) by 324 days.

(21) Appl. No.: 18/003,928

(22) PCT Filed: Jun. 11, 2021

(86) PCT No.: PCT/CN2021/099646
§ 371 (c)(1),
(2) Date: Dec. 30, 2022

(87) PCT Pub. No.: WO2021/213551
PCT Pub. Date: Oct. 28, 2021

(65) Prior Publication Data
US 2023/0263364 A1    Aug. 24, 2023

(30) Foreign Application Priority Data
Jul. 1, 2020 (CN) .......... 202010625518.X

(51) Int. Cl.
*A47L 15/44* (2006.01)
*D06F 39/02* (2006.01)
(Continued)

(52) U.S. Cl.
CPC ........ *A47L 15/4418* (2013.01); *D06F 39/022* (2013.01); *F16K 15/026* (2013.01); *F16K 15/148* (2013.01)

(58) Field of Classification Search
CPC . A47L 15/4418; D06F 39/022; F16K 15/026; F16K 15/148
See application file for complete search history.

(56) References Cited

U.S. PATENT DOCUMENTS 9,487,904 B2 * 11/2016 Kim ................ D06F 39/028
11,193,234 B2 * 12/2021 Lee ................ D06F 39/088
(Continued)

FOREIGN PATENT DOCUMENTS

| CN | 104706299 A | 6/2015 |
| CN | 104894813 A | 9/2015 |

(Continued)

OTHER PUBLICATIONS

International Search Report (PCT/ISA/210) with English translation and Written Opinion (PCT/ISA/237) mailed Sep. 2, 2021, by the Chinese Patent Office as the International Searching Authority for International Application No. PCT/CN2021/099646.

*Primary Examiner* — Vishal Pancholi
(74) *Attorney, Agent, or Firm* — BUCHANAN, INGERSOLL & ROONEY PC

(57) ABSTRACT

An automatic detergent feeding device includes a liquid storage box, the liquid storage box is provided with a liquid outlet channel, the inside of the liquid outlet channel is provided with an opening and closing valve assembly for opening/closing the liquid outlet channel and an anti-backflow valve assembly for preventing an external liquid from flowing backwards into the liquid storage box, and the anti-backflow valve assembly is arranged at the upstream, corresponding to a liquid outlet direction, of the opening and closing valve assembly. The automatic detergent feeding (Continued)

device is provided with the anti-backflow valve assembly to prevent the external liquid from flowing backwards into the liquid storage box. Therefore, in case of failure of an extraction unit, the anti-backflow valve assembly will close the liquid outlet channel of the liquid storage box to prevent the external liquid from flowing backwards into the liquid storage box to cause water overflow.

14 Claims, 6 Drawing Sheets

(51) Int. Cl.
*F16K 15/02* (2006.01)
*F16K 15/14* (2006.01)

(56) References Cited

U.S. PATENT DOCUMENTS

| | | | |
|---|---|---|---|
| 2006/0123852 A1 | 6/2006 | Wiedemann et al. | |
| 2007/0079637 A1* | 4/2007 | Song | D06F 39/02 |
| | | | 68/17 R |
| 2011/0154865 A1* | 6/2011 | Lee | D06F 39/02 |
| | | | 68/17 R |
| 2012/0006077 A1* | 1/2012 | Mun | D06F 39/022 |
| | | | 222/386 |
| 2014/0109323 A1* | 4/2014 | Kim | D06F 39/086 |
| | | | 68/17 R |

FOREIGN PATENT DOCUMENTS

| | | |
|---|---|---|
| CN | 108729130 A | 11/2018 |
| CN | 110215174 A | 9/2019 |
| CN | 111101346 A | 5/2020 |

* cited by examiner

A-A

B-B

AUTOMATIC DETERGENT FEEDING DEVICE AND WASHING APPARATUS

TECHNICAL FIELD

The disclosure belongs to the technical field of washing apparatus, in particular to an automatic detergent feeding device and washing apparatus.

BACKGROUND

With the continuous development and progress of technology, the research and development of washing apparatus such as washing machines and dishwashers have paid more and more attention to improving the user experience on the basis of meeting people's basic washing requirements. More and more washing machines and dishwashers are provided with an automatic detergent feeding function, so that users do not need to add the detergent manually when using the washing machines to wash clothes or when using the dishwashers to wash dishes, which greatly facilitates the user's use and improves the user's experience.

At present, when the automatic feeding device is in normal operation, the washing additive stored in the liquid storage box is extracted by a pump and the like and then dispensed into the washing chamber of the washing machine or dishwasher.

In the prior art, the liquid storage box in the automatic feeding device is only used to store the washing additive, and the liquid in the liquid storage box will not leak after the liquid storage box device is removed from the automatic feeding device.

However, in some cases of failure, the water in the feeding device will flow backwards into the liquid storage box through a pipeline that absorbs the detergent, causing water overflow and other failures.

In view of this, the disclosure is proposed.

SUMMARY

The technical problem to be solved by the disclosure is to overcome the shortcomings of the prior art and provide an automatic detergent feeding device to prevent liquid from flowing backwards.

Another objective of the present disclosure is to provide washing apparatus, including the above-mentioned automatic detergent feeding device.

To solve the above technical problems, the basic concept of the technical solution adopted by the disclosure is:

An automatic detergent feeding device, including a liquid storage box, which is provided with a liquid outlet channel, and the inside of the liquid outlet channel is provided with:

an opening and closing valve assembly, which is used for opening/closing the liquid outlet channel; and an anti-backflow valve assembly, which is arranged at the upstream, corresponding to a liquid outlet direction, of the opening and closing valve assembly to prevent an external liquid from flowing backward into the liquid storage box.

Further, the opening and closing valve assembly and the anti-backflow valve assembly cooperate to make the liquid outlet channel have a first state and a second state;

in the first state, both the opening and closing valve assembly and the anti-backflow valve assembly are opened, and the liquid outlet channel is opened; and in the second state, the opening and closing valve assembly is opened, the anti-backflow valve assembly is closed, and the liquid outlet channel is closed.

Further, the anti-backflow valve assembly includes a first valve seat and a first valve core, the first valve seat is sealingly connected with the liquid outlet channel, the first valve seat is provided with a first valve hole for the first valve core to pass through and a first through-hole for the detergent to pass through, the first valve core is arranged in the first valve hole to open/close the first through-hole.

Preferably, the first valve seat includes a first valve body and a first valve cover, the first valve body is sealingly connected with a liquid outlet channel, one end of the first valve body is connected with the first valve cover, and the other end communicates with the liquid outlet channel, and the first valve hole and the first through-hole are arranged in the first valve cover.

Further, the first valve core includes a connecting part and a switching part, the connecting part is arranged in the first valve hole in a penetrating mode, one end of the connecting part is provided with a limit part, and the other end is connected with the switching part, and the switching part deforms to open the first through-hole, and the switching part is reset to close the first through-hole.

Further, the first valve cover is provided with an annular groove, the switching part is an inverted umbrella-shaped structure or conical structure, which is covered on a lower end face of the first valve cover, the switching part keeps an original state or deforms, so that an end of the switching part extends into or leaves the annular groove to close/open the first through-hole;

and preferably, the inside of the connecting part is provided with a hollow groove which is used for assisting the deformation of the switching part.

Further, the opening and closing valve assembly includes a second valve seat and a second valve core, the second valve seat is sealingly connected with the liquid outlet channel, the second valve seat is provided with a liquid outlet for the detergent to pass through, and the second valve core extends into/out of the liquid outlet to close/open the liquid outlet.

Further, the second valve seat includes a second valve body and a second valve cover which are sealingly connected, one end of the second valve body is arranged with the second valve cover, and the other end is arranged with the liquid outlet, and the second valve cover is provided with a second valve hole and a second through-hole used for communicating with the liquid outlet channel, one end of the second valve core is able to be arranged in the second valve hole in an axially movable mode, and the other end extends into/out of the liquid outlet.

Further, the second valve core includes a valve rod and a sealing part connected with the valve rod, and the valve rod is able to be arranged in the second valve hole in an axially movable mode to drive the sealing part to extend into/out of the liquid outlet; and preferably, a return spring is arranged between the second valve core and the second valve cover, one end of the return spring abuts on the second valve cover and the other end abuts on the sealing part.

Further, the automatic detergent feeding device further includes an extraction unit for extracting the detergent;

the extraction unit includes a liquid outlet pipe which communicates with the liquid outlet, the liquid outlet pipe is provided with a pushing unit on one side near the liquid outlet, and the pushing unit pushes the sealing part to exit the liquid outlet; and preferably, the pushing unit is a pushing rod, one end of the sealing part is provided with a groove which is concave in the direction of the valve rod, and the pushing rod matches the groove.

A washing apparatus includes the automatic detergent feeding device as described above.

After adopting the above technical solution, the disclosure has the following beneficial effects compared with the prior art.

1. The the automatic detergent feeding device of the disclosure is provided with the anti-backflow valve assembly to prevent the external liquid from flowing backwards into the liquid storage box. Therefore, in case of failure of the extraction unit, the anti-backflow valve assembly will close the liquid outlet channel of the liquid storage box to prevent the external liquid from flowing backwards into the liquid storage box to cause water overflow.

2. The disclosure uses the restoring force of the switching part itself to reset. As long as the suction force of the extraction unit disappears, the end of the switching part will extend into the annular groove to close the first through-hole, thus preventing backflow.

3. In this disclosure, the annular groove is arranged on the first valve cover for auxiliary sealing of the switching part. When the water flows backwards into the hollow channel of the first valve body, the end of the switching part is pressed in the annular groove under the static pressure of water, so that the annular groove has a limiting effect on the switching part to avoid movement of the switching part, thus further improving the sealing performance of the switching part to the first through-hole, and preventing water from entering the liquid storage box.

4. The disclosure is provided with a hollow groove inside the connecting part to assist the deformation of the switching part, which is used to bear the deformation of the switching part. When the opening and closing valve assembly is opened, the switching part will be deformed under the suction force generated by the extraction unit, that is, when the end of the switching part leaves the annular groove, the hollow groove provides a certain deformation space for the deformation of the switching part, thus making the switching part easy to deform, and avoiding the failure that the switching part can not open the first through-hole.

The specific embodiments of the present disclosure will be further described in detail with the accompanying drawings.

BRIEF DESCRIPTION OF THE DRAWINGS

As a part of the disclosure, the attached drawings are used to provide a further understanding of the disclosure. The schematic embodiments and descriptions of the disclosure are used to explain the disclosure, but do not constitute an improper limitation of the disclosure. Obviously, the drawings in the following description are only some embodiments. For those skilled in the art, other drawings can also be obtained from these drawings without creative work. In the attached figures.

Figure 1:
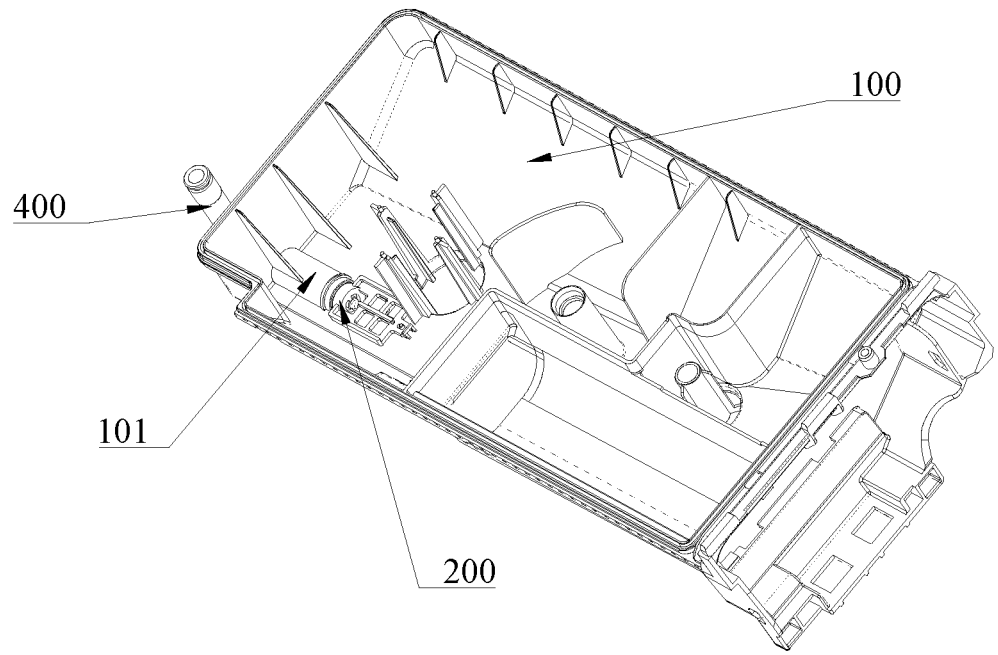
FIG. 1 is a schematic diagram of the automatic detergent feeding device of the disclosure.
Figure 2:
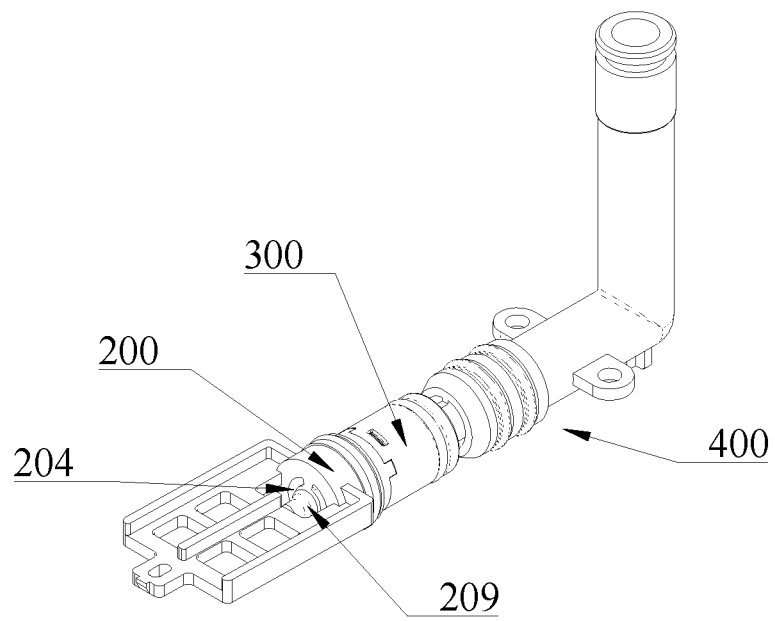
FIG. 2 is a structural diagram of the opening and closing valve assembly and the anti-backflow valve assembly of the disclosure.
Figure 3:
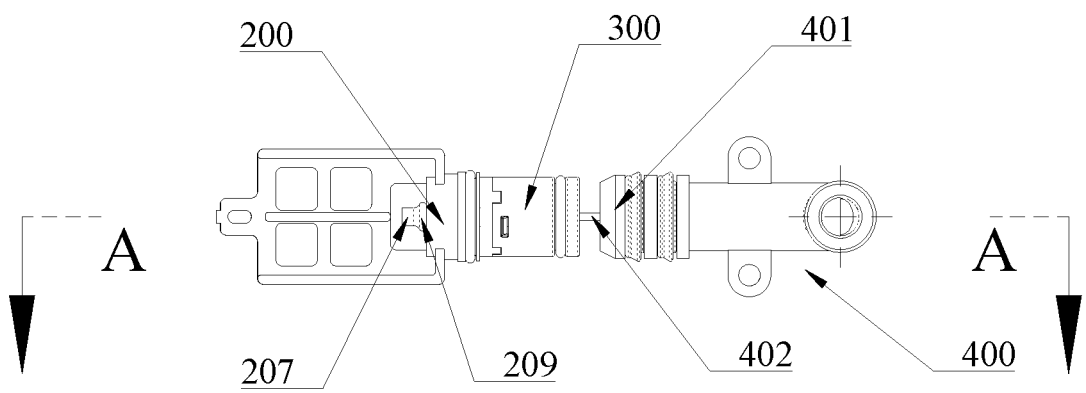
FIG. 3 is a top view of the structure in FIG. 2.
Figure 4:
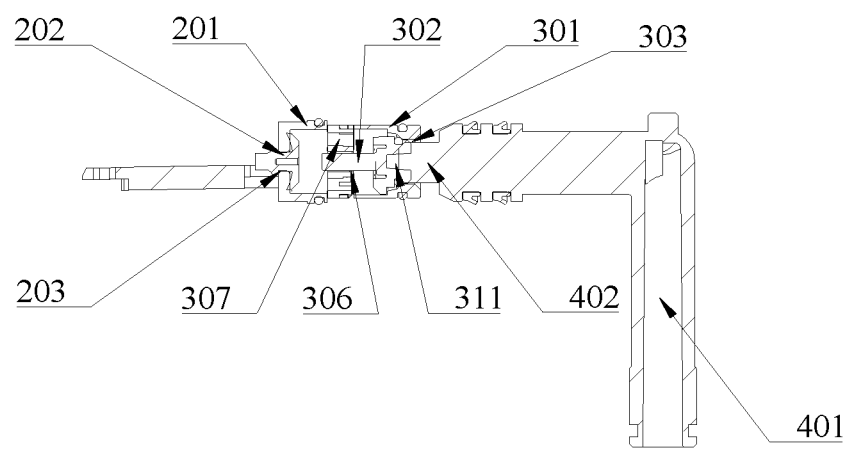
FIG. 4 is an A-A section view in FIG. 3.
Figure 5:
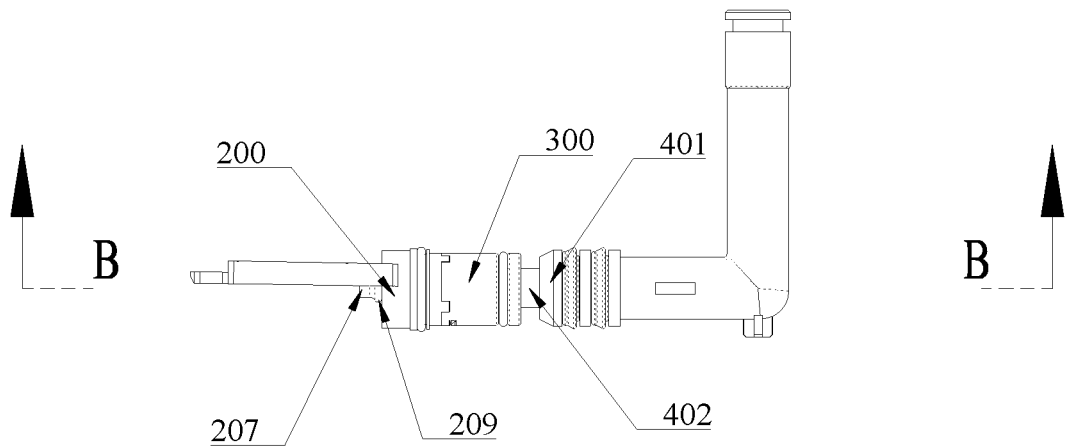
FIG. 5 is a main view of the structure in FIG. 2.
Figure 6:
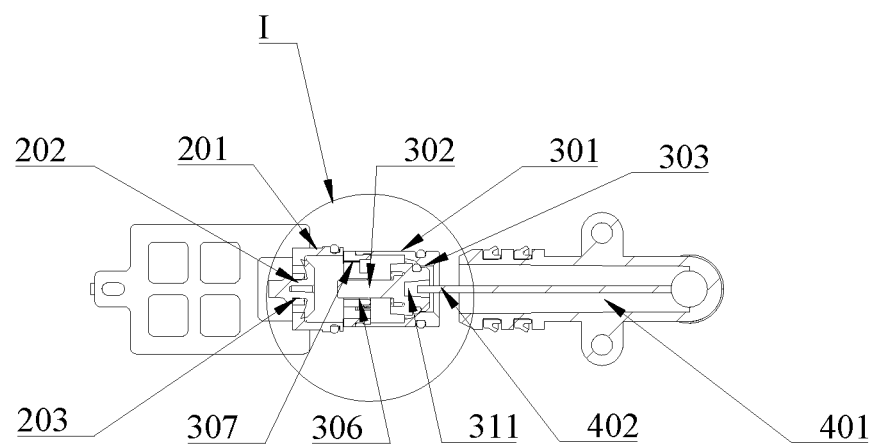
FIG. 6 is a B-B section view in FIG. 5.
Figure 7:
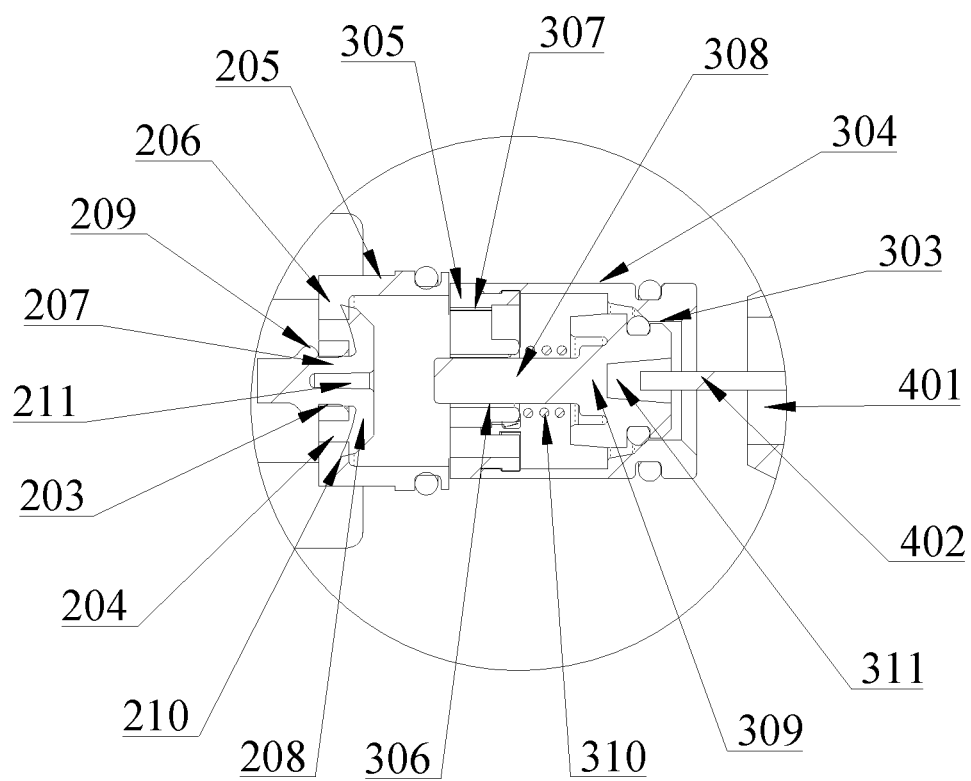
FIG. 7 is a partial enlarged view of part I in FIG. 6.

In the figures: 100. liquid storage box; 101. liquid outlet channel;

200. anti-backflow valve assembly; 201. first valve seat; 202. first valve core; 203. first valve hole; 204. first through-hole; 205. first valve body; 206. first valve cover; 207. connecting part; 208. switching part; 209. limit part; 210. annular groove; 211. hollow groove;

300. opening and closing valve assembly; 301. second valve seat; 302. second valve core; 303. liquid outlet; 304. second valve body; 305. second valve cover; 306. second valve hole; 307. second through-hole; 308. valve rod; 309. sealing part; 310. return spring; 311. groove;

400. feeding mechanism; 401. liquid outlet pipe; 402. pushing rod.

It should be noted that these drawings and text descriptions are not intended to limit the conceptual scope of the disclosure in any way, but rather to explain the concept of the disclosure for those skilled in the art by referring to specific embodiments.

DETAILED DESCRIPTION

In order to make the objectives, technical solutions and advantages of the embodiments of the disclosure clearer, the technical solutions in the embodiments will be described clearly and completely in combination with the drawings in the embodiments of the disclosure. The following embodiments are used to illustrate the disclosure, but not to limit the scope of the disclosure.

In the description of the present disclosure, it should be noted that the orientation or position relationship indicated by the terms "up", "down", "front", "back", "left", "right", "vertical", "inside", "outside", etc. is based on the orientation or position relationship shown in the attached drawings, which is only for the convenience of describing the present disclosure and simplifying the description, rather than indicating or implying that the device or element referred to must have a particular orientation, be constructed and operate in a particular orientation, and therefore cannot be construed as a limitation of the disclosure.

In the description of the present disclosure, it should be noted that unless otherwise specified and limited, the terms "mounted", "connected" and "connection" should be understood in a broad sense, for example, connection may be fixed connection, detachable connections or integrated connection, may be mechanical connection or electrical connection, and may be direct connection or indirect connection through an intermediate medium. The specific meaning of the above terms in the present disclosure can be understood, on a case-by-case basis, by those of ordinary skill in the art.

As shown in FIGS. 1 to 9, the disclosure provides an automatic detergent feeding device, including a liquid storage box 100 used for storing the detergent. The liquid storage box 100 is provided with a liquid outlet channel 101 used for discharging the detergent. The liquid outlet channel 101 is provided with an opening and closing valve assembly 300 for opening/closing the liquid outlet channel 101 and an anti-backflow valve assembly 200 used for preventing an external liquid from flowing backwards into the liquid storage box 100, and the anti-backflow valve assembly 200 is arranged at the upstream, corresponding to a liquid outlet direction, of the opening and closing valve assembly 300.

Specifically, as shown in FIGS. 2 to 9, the automatic detergent feeding device includes the liquid storage box 100 used for storing the detergent and a feeding mechanism 400 used for automatically feeding the detergent stored in the liquid storage box 100 into a washing chamber of the washing apparatus such as the washing machine or the dishwasher.

Figure 8:
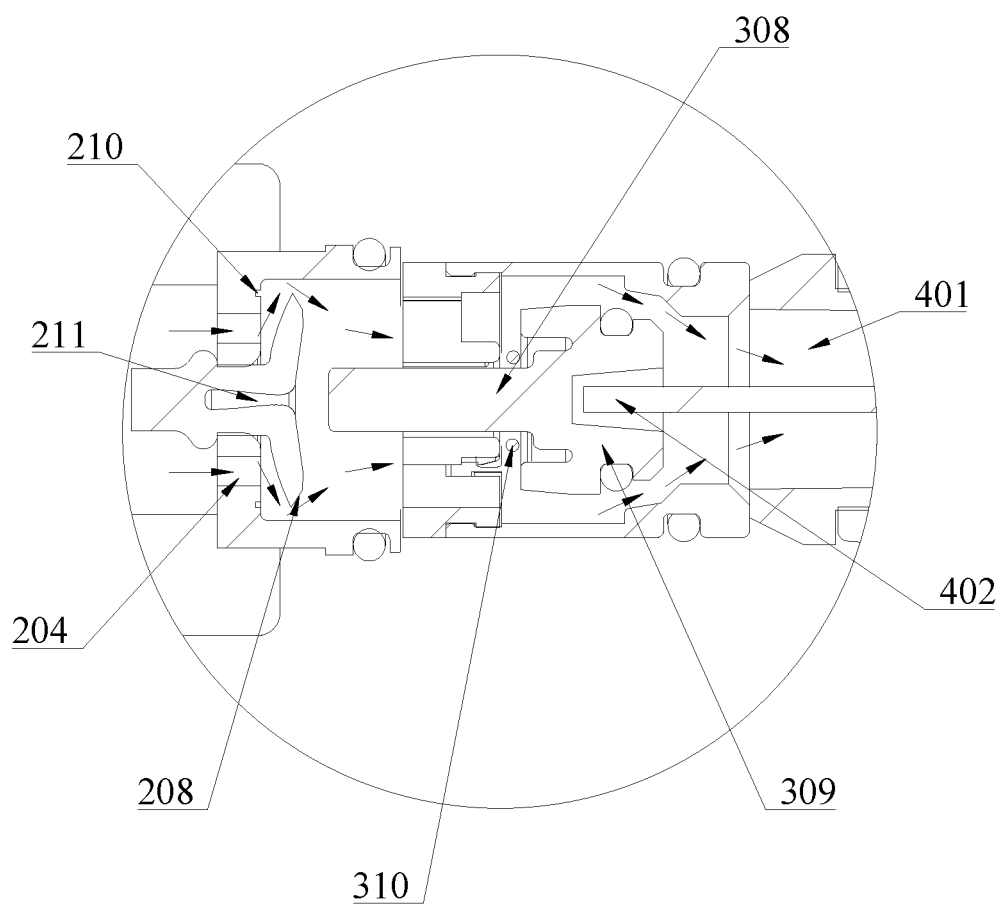
FIG. 8 is a structural diagram of the opening and closing valve assembly and the anti-backflow valve assembly in the first state.

As shown in FIG. 8, the feeding mechanism 400 includes an extraction unit and a liquid outlet pipe 401, the liquid outlet pipe 401 communicates with the liquid outlet 303. The extraction unit extracts the detergent stored in the liquid storage box 100 into the liquid outlet pipe 401 and then the detergent enters the washing chamber of the washing apparatus through a communicating pipeline.

Further, the extraction unit includes a venturi or siphon for generating negative pressure in the liquid outlet pipe 401, or a pump or other equipment capable of generating the suction force.

Therefore, the opening and closing valve assembly 300 and the anti-backflow valve assembly 200 cooperate to make the liquid outlet channel 101 have the first state and the second state.

In the first state, both the opening and closing valve assembly 300 and the anti-backflow valve assembly 200 are opened, and the liquid outlet channel 101 is opened, as shown in FIG. 8.

Figure 9:
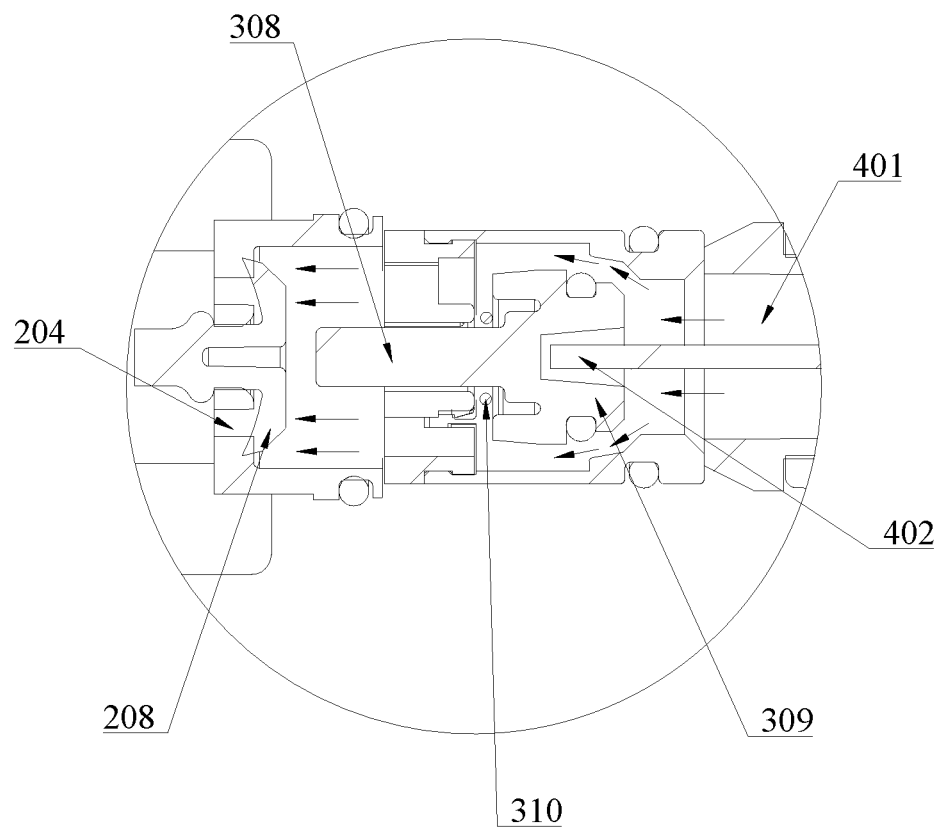
FIG. 9 is a structural diagram of the opening and closing valve assembly and the anti-backflow valve assembly in the second state.

In the second state, the opening and closing valve assembly 300 is opened, the anti-backflow valve assembly 200 is closed, and the liquid outlet channel 101 is closed, as shown in FIG. 9.

In detail, since the normal state of the opening and closing valve assembly 300 is the opened state when the liquid storage box 100 is in the washing apparatus, the washing apparatus controls the operation of the extraction unit after the washing procedure starts under normal conditions, and the anti-backflow valve assembly 200 is opened under the effect of the suction force generated by the extraction unit. Therefore, when the anti-backflow valve assembly 200 and the opening and closing valve assembly 300 are both in the opened state, the liquid outlet channel 101 is opened, and the flow direction of the detergent is the arrow direction in FIG. 8. The detergent stored in the liquid storage box 100 enters the liquid outlet pipe 401 through the anti-backflow valve assembly 200 and the opening and closing valve assembly 300 in turn, and then the detergent is transported to the washing chamber of the washing apparatus by the communicating pipeline to wash the articles to be washed. When the amount of the detergent entering the washing chamber reaches a set value, the washing apparatus control the extraction unit to stop operating. Then, because the extraction unit no longer generates the suction force at this time, the anti-backflow valve assembly 200 is closed without the external force. Therefore, when the opening and closing valve assembly 300 is opened and the anti-backflow valve assembly 200 is closed, the liquid outlet channel 101 is closed, and the detergent stored in the liquid storage box 100 will not flow out through the opening and closing valve assembly 300, and the external liquid will not flow backwards into the liquid storage box 100 through the opening and closing valve assembly 300, which will not only prevent the leakage of detergent, but also prevent the overflow of water from the liquid storage box 100, thus greatly improving the safety performance of the automatic detergent feeding mechanism 400.

Since the opening and closing valve assembly 300 is always in the opened state, when the extraction unit fails in the process of detergent feeding, the extraction unit cannot produce the suction force, and the water in the communicating pipeline may flow backwards into the liquid storage box 100 through the liquid outlet pipe 401, FIG. 9 shows the backflow direction of the water. In the disclosure, the anti-backflow valve assembly 200 is arranged in the liquid outlet channel 101 of the liquid storage box 100. If the extraction unit fails to generate the suction force, the anti-backflow valve assembly 200 will close automatically. Therefore, even if the water in the communicating pipeline flows backwards, the water will not flow backwards into the liquid storage box 100.

Further, the liquid storage box 100 in the above scheme is a box structure with a liquid storage chamber. The liquid storage chamber stores the detergent, and the box structure is provided with a filling port for filling the liquid storage chamber with the detergent. Alternatively, the liquid storage box 100 includes a liquid storage box main body with a containing chamber and a replaceable liquid storage box body. The liquid storage box body is detachably arranged in the containing chamber of the liquid storage box main body to facilitate the replacement of the liquid storage box body, or the liquid storage box body is taken out, the detergent is added into the liquid storage box body and then the liquid storage box body is put back into the liquid storage box main body.

In some embodiments of the disclosure, as shown in FIGS. 3 to 7, the anti-backflow valve assembly 200 includes a first valve seat 201 and a first valve core 202, the first valve seat 201 is sealingly connected with the liquid outlet channel 101, the first valve seat 201 is provided with a first valve hole 203 for the first valve core 202 to pass through and a first through-hole 204 for the detergent to pass through, and the first valve core 202 is arranged in the first valve hole 203 to open/close the first through-hole 204.

Specifically, there is a hollow channel in the first valve seat 201 for the detergent to pass through. A sealing connector is arranged between the first valve seat 201 and an inner side wall of the liquid outlet channel 101 to realize sealing connection or the first valve seat 201 and the liquid outlet channel 101 are designed as an integral structure. The first through-hole 204 is a through-hole connecting the liquid outlet channel 101 and the inside of the first valve seat 201. When the first valve core 202 opens the first through-hole 204, the detergent enters the first valve seat 201 through the first through-hole 204.

In this embodiment, a plurality of first through-holes 204 are arranged around the first valve hole 203. The shape and number of the first through-holes 204 are not limited. The round hole, square hole or irregular hole which can make the detergent pass through can be the first through-hole 204.

Preferably, the first valve seat 201 includes the first valve body 205 and the first valve cover 206. The first valve body 205 is sealingly connected with the liquid outlet channel 101. One end of the first valve body 205 is connected with the first valve cover 206, and the other end communicates with the liquid outlet channel 101. The first valve hole 203 and the first through-holes 204 are arranged in the first valve cover 206.

In detail, the hollow channel is arranged in the first valve body 205, the outer side of the first valve body 205 is sealingly connected with the inner side of the liquid outlet channel 101, one end of the first valve body 205 is connected with the first valve cover 206, the other end communicates with the liquid outlet channel 101, and the first valve hole 203 and the first through-holes 204 are arranged in the first valve cover 206. Thus, when the first through-holes 204 are opened, the detergent enters the hollow channel through the first through-holes 204. When the first through-holes 204 are closed, the detergent cannot enter the hollow channel through the first through-holes 204. Conversely, when the first through-holes 204 are closed, the liquid in the hollow channel cannot enter the liquid storage box 100 through the first through-holes 204.

In the above scheme, the detergent in the liquid storage box 100 enters the opening and closing valve assembly 300 located in the liquid outlet channel 101 through the first through-holes 204 in the first valve cover 201, and then flows out through the liquid outlet 303 of the opening and closing valve assembly 300.

In this embodiment, the first valve body 205 and the first valve cover 206 are integrally formed, or fixed and sealingly connected.

Further, the first valve core 202 includes a connecting part 207 and a switching part 208. The connecting part 207 is arranged in the first valve hole 203 in a penetrating mode. One end of the connecting part 207 is provided with a limit part 209, and the other end is connected with the switching part 208. The switching part 208 deforms to open the first through-hole 204, and the switching part 208 resets to close the first through-hole 204.

In this embodiment, the connecting part 207 is a columnar structure, and the limit part 209 is a boss structure formed by protruding the outer wall of the columnar structure outward in the radial direction. The connecting part 207 is limited by engaging the boss structure with the first valve hole 203.

In detail, the connecting part 207 and the switching part 208 are integrally formed elastic material elements. The connecting part 207 is arranged in the first valve hole 203 in a penetrating mode, and plays the role of fixing the switching part 208. One end of the connecting part 207 is provided with a limit part 209, which is clamped on the first valve hole 203, so that the switching part 208 can maintain relative stability in the axial direction when the first through-hole 204 is opened by deformation of the switching part 208 or the first through-hole 204 is closed by resetting of the switching part 208.

Further, the first valve cover 206 is provided with an annular groove 210, and the switching part 208 is an inverted umbrella structure or a conical structure, which is covered on the lower end face of the first valve cover 206. The switching part 208 keeps its original state or deforms so that the end of the switching part 208 extends into or out of the annular groove 210 to close/open the first through-holes 204.

The switching part 208 of the disclosure is an inverted umbrella structure or a conical structure. Due to own structural characteristics, the switching part 208 is covered on the lower end face of the first valve cover 206 when the switching part 208 is kept normal without external force.

In detail, as shown in FIG. 9, the first valve cover 206 of the disclosure is provided with an annular groove 210 for assisting the sealing of the switching part 208. If the extraction unit fails, the water in the communicating pipeline of the washing apparatus will flow backwards into the hollow channel of the first valve body 205. At this time, since the switching part 208 is covered on the lower end face of the first valve cover 206 under normal conditions, the first through-holes 204 are closed, and water will not enter the liquid storage box 100 through the first through-holes 204.

Further, when the water flows backwards into the hollow channel of the first valve body 205, the end of the switching part 208 is pressed in the annular groove 210 under the static pressure of the water, so that the annular groove 210 has a limiting effect on the switching part 208 to avoid the movement, thus further improving the sealing performance of the switching part 208 to the first through-holes 204, and preventing water from entering the liquid storage box 100.

Further, as shown in FIG. 8, the inside of the connecting part 207 of the present disclosure is provided with a hollow groove 211 which is used to assist the deformation of the switching part 208 to support the deformation of the switching part 208. Then, when the opening and closing valve assembly 300 is opened, the switching part 208 deforms under the suction force generated by the extraction unit, that is, when the end of the switching part 208 leaves the annular groove 210, the hollow groove 211 provides a certain deformation space for the deformation of the switching part 208, making the switching part 208 easy to deform, and avoiding the failure that the switching part 208 can not open the first through-holes 204.

As mentioned earlier, the liquid storage box 100 is a box structure with a liquid storage chamber, or the liquid storage box 100 includes a liquid storage box main body with a containing chamber and a replaceable liquid storage box body. The liquid storage box body is taken out of the containing chamber of the liquid storage box main body for replacement, or the liquid storage box body is taken out, the detergent is added into the liquid storage box body and then the liquid storage box body is put back into the liquid storage box main body.

When the liquid outlet box body is disposable, the opening and closing valve assembly 300 only needs to be a component with a sealing function.

In this case, when the liquid storage box body is not put into the washing apparatus, the opening and closing valve assembly 300 is intact, and the detergent is sealed in the liquid storage box body. When the liquid storage box body is put into the washing apparatus, the opening and closing valve assembly 300 is damaged under the action of the pushing rod 402, then the opening and closing valve assembly 300 is in the opened state.

When the liquid outlet box body is reusable, the opening and closing valve assembly 300 needs to have two states.

In this case, when the liquid storage box body is not put into the washing apparatus, the opening and closing valve assembly 300 is closed, and the detergent in the liquid storage box body cannot flow out through the opening and closing valve assembly 300. When the liquid storage box body is put into the washing apparatus, the opening and closing valve assembly 300 is opened to allow the detergent to pass through. When the detergent in the liquid storage box body is used up, the liquid outlet box body is taken out from the washing apparatus. At this time, the opening and closing valve assembly 300 still needs to be closed, so that when the user adds detergent to the liquid storage box body, the detergent cannot flow out through the opening and closing valve assembly 300.

Therefore, in this case, the opening and closing valve assembly 300 needs to have the on-off function. Then, in some embodiments of the disclosure, as shown in FIGS. 3 to 9, the opening and closing valve assembly 300 includes a second valve seat 301 and a second valve core 302, the outer side of the second valve seat 301 is sealingly connected with the liquid outlet channel 101, the second valve seat 301 has a liquid outlet 303 for the detergent to pass through, and the second valve core 302 extends/exits the liquid outlet 303 to close/open the liquid outlet 303.

Specifically, the liquid outlet 303 of the second valve seat 301 communicates with the liquid outlet pipe 401, and the detergent can enter the liquid outlet pipe 401 through the liquid outlet 303. The liquid outlet 303 is closed when the second valve core 302 extends into the liquid outlet 303, and the liquid outlet 303 is opened when the second valve core 302 exits the liquid outlet 303 to realize the closing and opening of the opening and closing valve assembly 300.

In this embodiment, the second valve seat 301 includes a second valve body 304 and a second valve cover 305 which are sealingly connected. One end of the second valve body 304 is provided with the second valve cover 305, and the other end is provided with a liquid outlet 303. The second valve cover 305 is provided with a second valve hole 306 and a second through-hole 307 for communicating with the liquid outlet channel 101. One end of the second valve core 302 can be arranged in the second valve hole 306 in an axially moving mode, and the other end extends into/out of the liquid outlet 303.

Specifically, the second valve body 304 also has a hollow channel for the detergent to pass through. The second valve body 304 and the second valve cover 305 are sealingly connected. Further, a sealing connector should also be arranged between the outside of the second valve body 304 and the second bonnet 305 and the inner side wall of the liquid outlet channel 101, so that the detergent entering the opening and closing valve assembly 300 can only flow through the hollow channel of the second valve body 304 and cannot leak into the liquid outlet channel 101, thus preventing the detergent from being unable to be discharged from the liquid outlet 303 to form dirt after leaking into the liquid outlet channel 101.

The second valve cover 305 is arranged at the end close to the anti-backflow valve assembly 200. The second valve cover 305 is provided with the second through-hole 307 which communicates with the anti-backflow valve assembly 200 to allow the detergent to pass through.

The second valve cover 305 is also provided with a second valve hole 306. The second valve core 302 penetrates through the second valve hole 306. Also, one end of the second valve core 302 can move axially in the second valve hole 306, which is used to drive the other end of the second valve core 302 to extend into or out of the liquid outlet 303 so as to close or open the liquid outlet 303.

In this embodiment, the second valve core 302 includes a valve rod 308 and a sealing part 309 connected with the valve rod 308. The valve rod 308 can be arranged in the second valve hole 306 in an axially moving mode to drive the sealing part 309 to extend into/out of the liquid outlet 303. In particular, the sealing part 309 matches the shape of the liquid outlet 303.

Further, a return spring 310 is arranged between the second valve core 302 and the second valve cover 305. One end of the return spring 310 abuts on the second valve cover 305, and the other end abuts on the sealing part 309.

In the above scheme, as shown in FIG. 8, when the opening and closing valve assembly 300 is opened, the sealing part 309 moves towards one side of the anti-backflow valve assembly 200 under the action of an external force and leaves away from the liquid outlet 303, so that the liquid outlet 303 is opened. Specifically, under the action of the external force, the sealing part 309 compresses the return spring 310, and the valve rod 308 moves to one side of the anti-backflow valve assembly 200 in the second valve hole 306. At this time, the hollow channel of the first valve body 205 of the anti-backflow valve assembly 200 also provides the moving space for the valve rod 308 of the opening and closing valve assembly 300 to move.

When the liquid storage box body is taken out of the washing apparatus, the external force acting on the sealing part 309 is canceled, and the return spring 310 uses its own restoring force to move the valve rod 308 to one side of the liquid outlet 303, while driving the sealing part 309 to extend into the liquid outlet 303 to close the liquid outlet 303.

In some embodiments of the disclosure, the liquid outlet pipe 401 is provided with a pushing unit on one side near the liquid outlet 303, and the pushing unit pushes the sealing part 309 out of the liquid outlet 303.

In the above scheme, the pushing unit is the part that provides an external force for the sealing part 309. When the pushing unit pushes the sealing part 309 out of the liquid outlet 303, the liquid outlet 303 sealingly communicates with the liquid outlet 401, and the detergent can enter the liquid outlet pipe 401 through the liquid outlet 303, and then enter the washing chamber of the washing apparatus.

Preferably, the pushing unit is a pushing rod 402, one end of the sealing part 309 is provided with a groove 311 concave in the direction of the valve rod 308, and the pushing rod 402 matches the groove 311.

In the above scheme, the groove 311 for matching with the pushing rod 402 is arranged at one end of the sealing part 309 near the liquid outlet 303, so that the pushing rod 402 is inserted into the groove 311 when the sealing part 309 is pushed, so that the liquid outlet 303 and the liquid outlet pipe 401 can be connected seamlessly to improve the sealing performance of detergent feeding.

Therefore, as shown in FIG. 8 and FIG. 9, the operating principle of the automatic detergent feeding mechanism 400 of the disclosure is:

when the liquid storage box 100 communicates with the feeding mechanism 400, the sealing part 309 of the opening and closing valve assembly 300 exits the liquid outlet 303 under the action of the external force, and the liquid outlet 303 is opened, so that the detergent can flow out from the liquid outlet 303. The end of the switching part 208 of the anti-backflow valve assembly 200 extends into the annular groove 210 and closes the first through-holes 204, so that the detergent can neither flow out of the liquid storage box 100 nor the external liquid can flow backwards into the liquid storage box 100.

Under the working state of extracting the detergent in the liquid storage box 100 by the feeding mechanism 400, when the automatic feeding mechanism 400 receives the feeding order of the washing apparatus, the extraction unit generates the suction force that can extract the detergent. Under the suction force, the switching part 208 of the anti-backflow valve assembly 200 deforms, the end of the switching part 208 leaves the annular groove 210, the first through-hole 204 is opened, and the detergent in the liquid storage box 100 passes through the first through-holes 204, the second through-hole 307 and the liquid outlet 303 to enter the liquid outlet pipe 401. When the automatic feeding mechanism 400 receives the command that feeding of the washing apparatus is finished, the extraction unit stops running, and the suction force generated by the extraction unit also disappears. Then, the switching part 208 of the anti-backflow valve assembly 200 will reset under its own restoring force, and its end will extend into the annular groove 210 to close the first through-hole 204, and the switching part 208 returns to the normal state.

In the above scheme, as long as the suction force of the extraction unit disappears, the switching part 208 will be reset under its own restoring force to make its end extend into the annular groove 210 to close the first through-holes 204.

In the above scheme, the automatic detergent feeding device of the disclosure is provided with the anti-backflow valve assembly 200 to prevent the external liquid from flowing backwards into the liquid storage box 100. Therefore, in case of a failure of the extraction unit, the anti-backflow valve assembly 200 will close the liquid outlet channel 101 of the liquid storage box 100 to prevent the external liquid from flowing backwards into the liquid storage box 100 to cause water overflow.

The disclosure also provides the washing apparatus, which can be a clothes processing device such as a washing machine or a dishwasher.

The above is only better embodiments of the disclosure, and does not limit the disclosure in any form. Although the disclosure has been disclosed in the better embodiments, it is not intended to limit the disclosure. Without departing from the scope of the technical solution of the disclosure, those of ordinary skill, familiar with the patent, can make some changes or modify the technical content mentioned above into equivalent embodiments with equivalent changes, and any simple modifications, equivalent changes and modifications made to the above embodiments according to the technical essence of the disclosure are still within the scope of the technical solution of the disclosure.

The invention claimed is:

1. An automatic detergent feeding device, comprising a liquid storage box, the liquid storage box is provided with a liquid outlet channel, wherein inside of the liquid outlet channel is provided with:
   an opening and closing valve assembly for opening/closing the liquid outlet channel; and
   an anti-backflow valve assembly, which is arranged at an upstream, corresponding to a liquid outlet direction, of the opening and closing valve assembly to prevent an external liquid from flowing backwards into the liquid storage box;
   the opening and closing valve assembly and the anti-backflow valve assembly cooperate to make the liquid outlet channel have a first state and a second state;
   in the first state, both the opening and closing valve assembly and the anti-backflow valve assembly are opened, and the liquid outlet channel is opened; and
   in the second state, the opening and closing valve assembly is opened, the anti-backflow valve assembly is closed, and the liquid outlet channel is closed;
   the anti-backflow valve assembly comprises a first valve seat and a first valve core,
   the first valve seat is sealingly connected with the liquid outlet channel, the first valve seat is provided with a first valve hole for the first valve core to pass through and a first through-hole for the detergent to pass through,
   the first valve core is arranged in the first valve hole to open/close the first through-hole.

2. The automatic detergent feeding device according to claim 1, wherein:
   the first valve core comprises a connecting part and a switching part, the connecting part is arranged in the first valve hole in a penetrating mode, an end of the connecting part is provided with a limit part, and an other end is connected with the switching part, and the switching part deforms to open the first through-hole, and the switching part is reset to close the first through-hole.

3. The automatic detergent feeding device according to claim 2, wherein:
   the first valve cover is provided with an annular groove, the switching part is an inverted umbrella-shaped structure or a conical structure, which is covered on a lower end face of the first valve cover, the switching part keeps an original state or deforms, so that an end of the switching part extends into or leaves the annular groove to close/open the first through-hole.

4. The automatic detergent feeding device according to claim 1, wherein:
   the opening and closing valve assembly comprises a second valve seat and a second valve core, the second valve seat is sealingly connected with the liquid outlet channel, the second valve seat is provided with a liquid outlet for the detergent to pass through, and the second valve core extends into/out of the liquid outlet to close/open the liquid outlet.

5. The automatic detergent feeding device according to claim 4, wherein:
   the second valve seat comprises a second valve body and a second valve cover which are sealingly connected, an end of the second valve body is arranged with the second valve cover, and an other end is arranged with the liquid outlet, and
   the second valve cover is provided with a second valve hole and a second through-hole for communicating with the liquid outlet channel, an end of the second valve core is arranged in the second valve hole and is able to move axially in the second valve hole, and an other end extends into/out of the liquid outlet.

6. The automatic detergent feeding device according to claim 5, wherein:
   the second valve core comprises a valve rod and a sealing part connected with the valve rod, and the valve rod is able to be arranged in the second valve hole in an axially movable mode to drive the sealing part to extend into/out of the liquid outlet.

7. The automatic detergent feeding device according to claim 6, further comprising an extraction unit for extracting the detergent;
   the extraction unit comprises a liquid outlet pipe, the liquid outlet pipe communicates with the liquid outlet, the liquid outlet pipe is provided with a pushing unit on one side near the liquid outlet, and the pushing unit pushes the sealing part to exit the liquid outlet.

8. A washing apparatus, comprising the automatic detergent feeding device according to claim 1.

9. The automatic detergent feeding device according to claim 1, wherein the first valve seat comprises a first valve body and a first valve cover, the first valve body is sealingly connected with the liquid outlet channel, an end of the first valve body is connected with the first valve cover, and an other end communicates with the liquid outlet channel, and the first valve hole and the first through-hole are arranged in the first valve cover.

10. The automatic detergent feeding device according to claim 3, wherein: inside the connecting part is provided with a hollow groove which is used for assisting a deformation of the switching part.

11. The automatic detergent feeding device according to claim 2, wherein:
   the opening and closing valve assembly comprises a second valve seat and a second valve core, the second valve seat is sealingly connected with the liquid outlet channel, the second valve seat is provided with a liquid outlet for the detergent to pass through, and the second valve core extends into/out of the liquid outlet to close/open the liquid outlet.

12. The automatic detergent feeding device according to claim 3, wherein:
the opening and closing valve assembly comprises a second valve seat and a second valve core, the second valve seat is sealingly connected with the liquid outlet channel, the second valve seat is provided with a liquid outlet for the detergent to pass through, and the second valve core extends into/out of the liquid outlet to close/open the liquid outlet.

13. The automatic detergent feeding device according to claim 6, wherein:
a return spring is arranged between the second valve core and the second valve cover, an end of the return spring abuts on the second valve cover and the an other end abuts on the sealing part.

14. The automatic detergent feeding device according to claim 7, wherein:
the pushing unit is a pushing rod, an end of the sealing part is provided with a groove which is concave in a direction of the valve rod, and the pushing rod matches the groove.

* * * * *